(12) United States Patent
Kobayashi et al.

(10) Patent No.: US 7,249,984 B2
(45) Date of Patent: Jul. 31, 2007

(54) ELECTRIC PROPULSION UNIT

(75) Inventors: Noboru Kobayashi, Shizuoka-ken (JP);
Takao Kawai, Shizuoka-ken (JP);
Yukio Matsushita, Shizuoka-ken (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 5 days.

(21) Appl. No.: 11/210,604

(22) Filed: Aug. 23, 2005

(65) Prior Publication Data
US 2006/0040573 A1 Feb. 23, 2006

(30) Foreign Application Priority Data
Aug. 23, 2004 (JP) .............................. 2004-242629

(51) Int. Cl.
*B60L 11/00* (2006.01)

(52) U.S. Cl. ........................................................ 440/6

(58) Field of Classification Search ..................... 440/6
See application file for complete search history.

(56) References Cited

U.S. PATENT DOCUMENTS

| 2,919,392 | A | * | 12/1959 | Smith ......................... 318/247 |
| 4,305,012 | A | * | 12/1981 | Friedel ........................ 310/87 |
| 5,336,119 | A | * | 8/1994 | Lais et al. ..................... 440/6 |
| 2002/0114983 | A1 | * | 8/2002 | Frank et al. ................... 429/9 |

FOREIGN PATENT DOCUMENTS

| DE | 20311667 U1 | * | 9/2003 |
| JP | 09-164999 | | 6/1997 |

* cited by examiner

*Primary Examiner*—Stephen Avila
(74) *Attorney, Agent, or Firm*—Knobbe, Martens, Olson & Bear LLP (57) ABSTRACT

An electric propulsion unit can include a propeller for producing thrust, a motor for driving the propeller, and a fuel cell for supplying electric power to drive the motor. The fuel cell can include a fuel cell stack for generating power and a fuel tank for feeding fuel to the fuel cell stack.

17 Claims, 12 Drawing Sheets

ELECTRIC PROPULSION UNIT

PRIORITY INFORMATION

This application claims priority to Japanese patent application Serial No. 2004-242629, filed on Aug. 23, 2004, the entire contents of which is hereby expressly incorporated by reference.

BACKGROUND OF THE INVENTIONS

1. Field of the Inventions

The present inventions relate to propulsion units for watercraft, and more particularly, electric propulsion units mountdable on boats.

2. Description of the Related Art

Some boats utilize an outboard motor as a propulsion device. Most outboard motors include an internal combustion engine driving a propeller for generating thrust. In these arrangements, a fuel tank for the internal combustion engine is disposed in the watercraft and is connected to the internal combustion engine with a flexible fuel line.

Other types of outboard motors utilize an electric motor for driving the propeller. Most of these types of outboard motors are configured for low power output and thus are typically used for "trolling." These types of outboard motors usually have a small control unit disposed at a top portion of the outboard motors, with a control handle extending outwardly therefrom. These motors are typically connected to a battery inside the associated watercraft. For example, Japanese Patent Document JP-A-Hei 9-164999 (pp. 1–11, FIGS. 1–13) discloses such an electric outboard motor.

SUMMARY OF THE INVENTIONS

An aspect of at least one of the embodiments disclosed herein includes the realization that in the boats having an outboard motor with an internal combustion engine as a propulsion unit for driving a propeller, it is necessary to secure a passage for exhaust gas from the engine in the propulsion unit to an exhaust passage underwater, which prevents downsizing.

In boats having electric outboard motors driven solely on battery power, on the other hand, no exhaust gas is emitted which allows downsizing, particularly of the lower portion of the outboard motor. However, batteries generally do not have such a sufficient capacity as to extend the cruising range, or electric motors with higher output cannot be mounted.

Thus, in accordance with an embodiment, an electric propulsion unit comprises a propeller configured to produce thrust for a watercraft, and a motor configured to drive the propeller. A fuel cell is configured to supply electric power to drive the motor.

Another aspect of at least one of the embodiments disclosed herein includes the realization that mounting a fuel tank in an outboard motor with a fuel cell for generating electricity avoids a costly component. For example, typical internal combustion engine-powered outboard motors are connected to a fuel tank, carried by the hull of the associated watercraft, with a flexible fuel line. A flexible fuel line is typically used because such outboard motors are mounted pivotally with respect to the transom of the associate watercraft to provide for steering of the watercraft. Such outboard motors are also typically mounted for tilting about a tilt axis for purposes of trimming the planing angle of the watercraft and for allowing the motor to "pop-up" when submerged objects are struck. Thus, the typical fuel line must be sufficiently flexible to accommodate the substantial movements of the outboard motor relative to the fuel tank carried by the hull of the associated watercraft.

In the art of fuel cells configured for electric power generation, such as those utilizing a proton exchange membrane in conjunction with hydrogen-rich fuels, substantial efforts have been directed to fuel tank design because hydrogen is a difficult substance to store. Thus, if a hydrogen fuel tank were disposed in a watercraft such that the outboard motor moves substantially relative to such a fuel tank, a flexible fuel line would be required. However, such a flexible fuel line, being configured to transfer pressurized hydrogen rich fuel from the fuel tank to the fuel cell, would be far more expensive than the typical fuel lines used for transferring gasoline.

Thus, by including the fuel cell fuel tank in an outboard motor, there is no need for a long flexible fuel line. Rather, the fuel tank can be connected to the fuel cell stack without long flexible fuel lines, thereby reducing the cost of the outboard motor and avoiding problems that might be associated with flexible fuel lines designed to carry hydrogen fuel.

Thus, in accordance with another embodiment, an outboard motor can comprise a fuel cell stack configured to generate electric power and a fuel tank configured to contain fuel for the fuel cell stack. The outboard motor can also include an electric motor, an inverter configured to supply electric power from the fuel cell stack to the electric motor, and a propeller driven by the electric motor.

BRIEF DESCRIPTION OF THE DRAWINGS

The above-mentioned and other features of the inventions disclosed herein are described below with reference to the drawings of preferred embodiments. The illustrated embodiments are intended to illustrate, but not to limit the inventions. The drawings contain the following figures.

DETAILED DESCRIPTION OF THE PREFERRED EMBODIMENT

Figure 1:
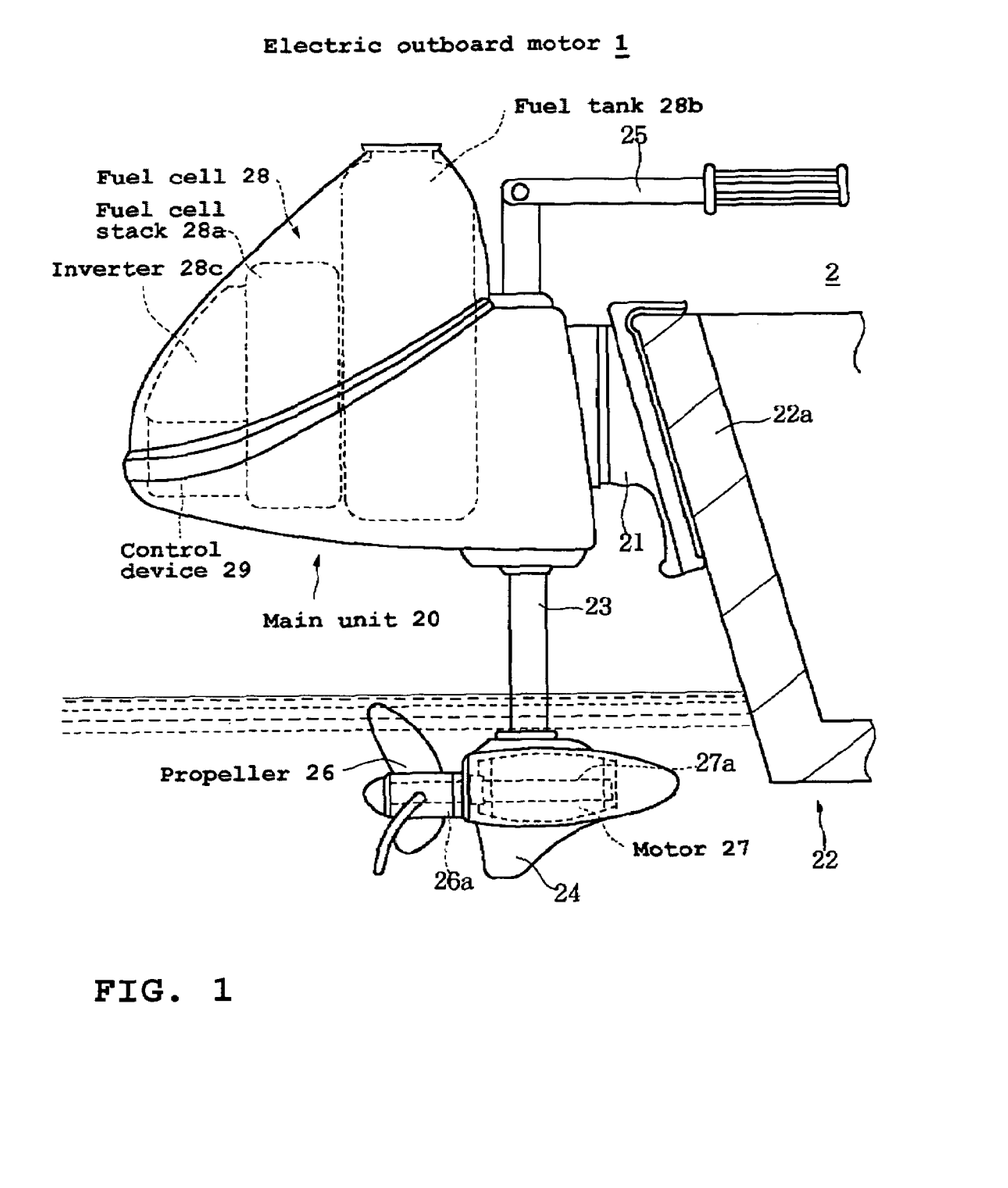
FIG. 1 is a side elevational view of an outboard motor in accordance with a first embodiment, the outboard motor being attached to a transom of a boat (partially shown in section) floating in water.

FIG. 1 shows a configuration of an outboard motor 1 having a fuel cell powered electric motor. This fuel cell powered electric motor arrangement is illustrated as being used with the outboard motor 1 because it has particular utility in this context. However, the present fuel cell powered electric motor arrangements can be used in other contexts, such as, for example, but without limitation, electric inboard motors, electric inboard-outboard motors and the like.

Figure 2:
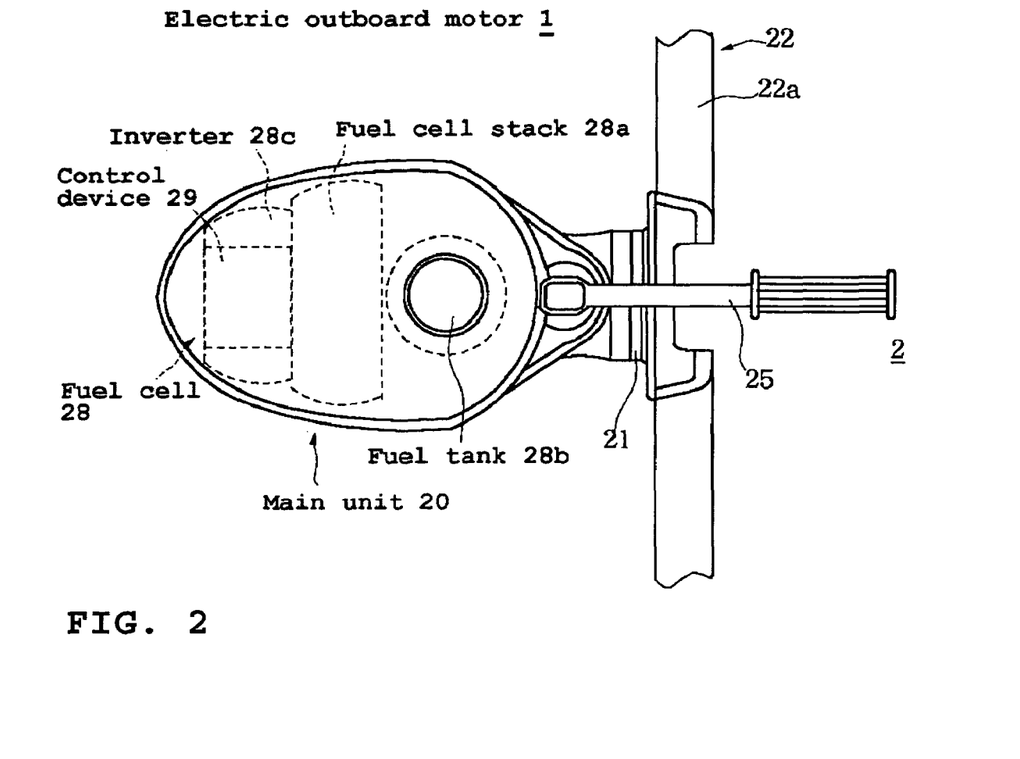
FIG. 2 is a top plan view of the outboard motor shown in FIG. 1.

FIGS. 1 and 2 show a first embodiment. FIGS. 1 and 2 show a boat on which the electric outboard motor 1 is mounted. The electric outboard motor 1 of this embodiment has a main unit 20 provided on a mounting bracket 21. The mounting bracket 21 is fixed to a transom 22a of a hull 22.

The main unit 20 can include a support tube 23. A lower case 24 can be provided at a lower side of the support tube 23. An operating handle 25 can be provided at an upper side thereof.

By manipulating the operating handle 25, the support tube 23 and the lower case 24 turn left and right for steering. The main unit 20 thus pivots relative to the transom 22a surface. The lower case 24 can be raised above the water surface while the boat is moored, for example, by tilting the main unit 20 upwardly about a tilt axis.

The lower case 24 can include a propeller 26 for producing thrust and a motor 27 for driving the propeller 26. A motor shaft 27a of the motor 27 and a propeller shaft 26a of the propeller 26 are arranged coaxially.

The main unit 20 can include a fuel cell 28 and a control device 29 configured to supply electric power to drive the motor 27. The fuel cell 28 can include a fuel cell stack 28a for generating power, a fuel tank 28b for feeding fuel to the fuel cell stack 28a, and an inverter 28c for supplying power from the fuel cell stack 28a to the motor 27. The fuel cell 28 can be placed as an integrated unit in the main unit 20. For the fuel fed to the fuel cell stack 28a, hydrogen fuel is used, for example. However, other types of fuels can also be used.

The fuel cell 28 can be arranged with the fuel tank 28b, the fuel cell stack 28a, and the inverter 28c placed in this order from the hull 22 side, or the front side and with the control device 29 placed under the inverter 28c.

The control device 29 can be configured to control the fuel cell 28 and the motor 27 according to an operation signal from a remote control device provided in a driver's area (not shown) of the boat 2. The control device 29 can also be configured to change the rotational direction of the motor 27 between forward and reverse, also according to an operation signal from the remote control device.

This embodiment includes a propeller 26 for producing thrust, a motor 27 for driving the propeller 26, and a fuel cell 28 for supplying electric power to drive the motor 27. The motor 27 is driven to produce thrust with the propeller 26, improving the range and duration of cruise. The fuel cell 28 of the electric outboard motor 1 can generate power which can be sufficient for the entire boat 2.

In this embodiment, the motor shaft 27a of the motor 27 and the propeller shaft 26a of the propeller 26 are arranged coaxially, and hence the motor 27 is located underwater. Therefore, the motor 27, which generates heat, is cooled by the water, will helps the motor 27 operate at a higher efficiency.

The fuel cell 28 is placed over the motor 27 and the propeller 26, and integrated in the electric outboard motor 1. This eliminates the need for connection with a battery located inside the boat 2 as in conventional approaches, which in turn allows easy mounting of the electric outboard motor 1 on the boat 2.

Yet another advantage is achieved by including the fuel tank 28b in the outboard motor 1. For example, a flexible fuel line, such as those typically used on outboard motors, is not needed. As is well known in the art, typical internal combustion engine-powered outboard motors are connected to a fuel tank, carried by the hull of the associated watercraft, with a flexible fuel line. A flexible fuel line is typically used because such outboard motors are mounted pivotally with respect to the transom of the associate watercraft to provide for steering of the watercraft. Such outboard motors are also typically mounted for tilting about a tilt axis for purposes of trimming the planing angle of the watercraft and for allowing the motor to "pop-up" when submerged objects are struck. Thus, the typical fuel line must be sufficiently flexible to accommodate the substantial movements of the outboard motor relative to the fuel tank carried by the hull of the associated watercraft.

In the art of fuel cells configured for electric power generation, such as those utilizing a proton exchange membrane in conjunction with hydrogen-rich fuels, substantial efforts have been directed to fuel tank design because hydrogen is a difficult substance to store. Thus, if a hydrogen fuel tank were disposed in a watercraft such that the outboard motor moves substantially relative to such a fuel tank, a flexible fuel line would be required. However, such a flexible fuel line, being configured to transfer pressurized hydrogen rich fuel from the fuel tank to the fuel cell, would be far more expensive than the typical fuel lines used for transferring gasoline.

Thus, by including the fuel cell fuel tank 28b in the outboard motor 1, there is no need for a long flexible fuel line. Rather, the fuel tank 28b can be connected to the fuel cell stack 28a without long flexible fuel lines, thereby reducing the cost of the outboard motor and avoiding problems that might be associated with flexible fuel lines designed to carry hydrogen fuel.

The fuel cell 28 can also be provided with the fuel tank 28b, the fuel cell stack 28a, and the inverter 28c arranged in this order from the front side. An upper portion of the fuel tank 28b can be placed higher than an upper portion of the transom 22a, but with the fuel cell stack 28a, the inverter 28c, the control device 29 located lower than that. Thus, the distance between the motor 27 and the fuel cell 28 can be short, which contributes to downsizing of the unit, and lowering the center of gravity relative to the hull 22.

With the fuel tank 28b placed in the electric outboard motor 1 being near to the rear of the boat 2, fuel can be supplied to the fuel tank 28b, or, where the fuel tank 28b is of a cartridge type, the cartridge can be replaced, easily from the boat 2 side.

Figure 3:
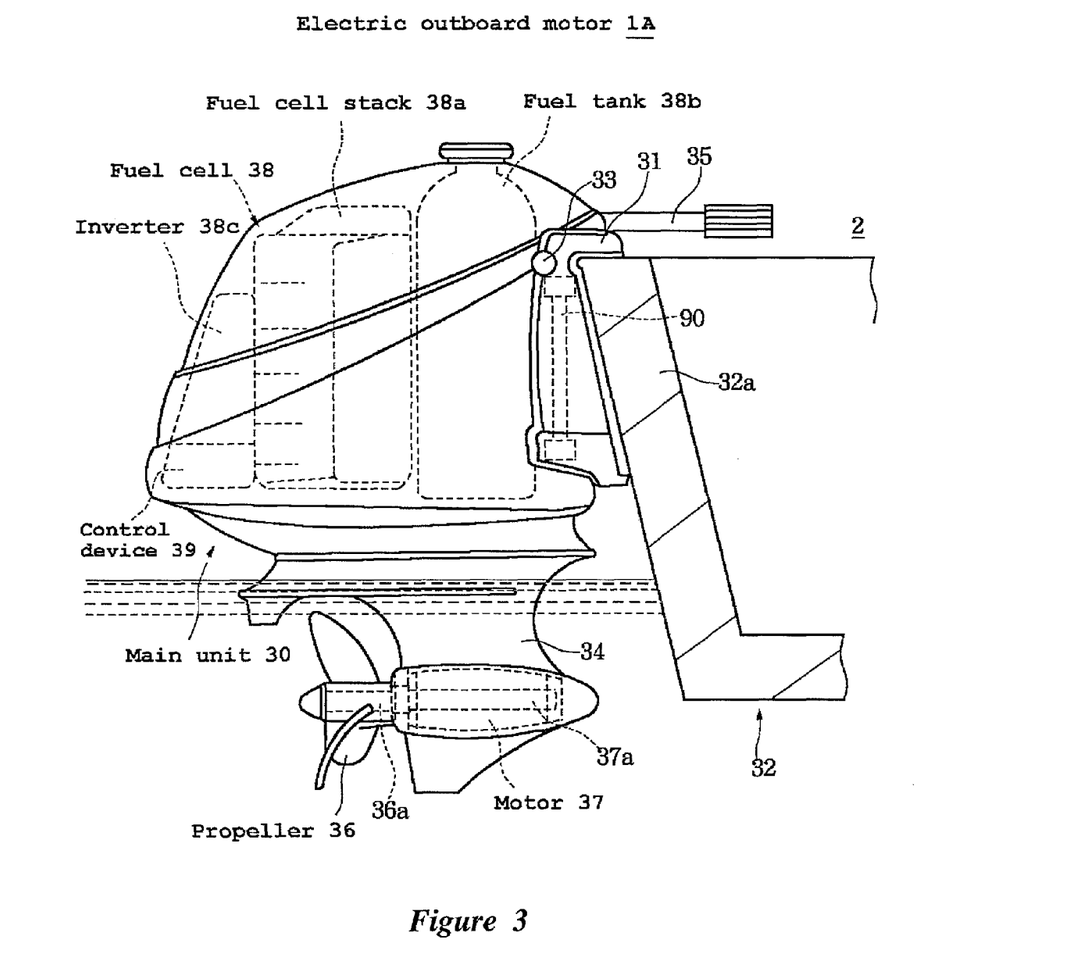
FIG. 3 is a side elevational view of a modification of the outboard motor of FIG. 1.
Figure 4:
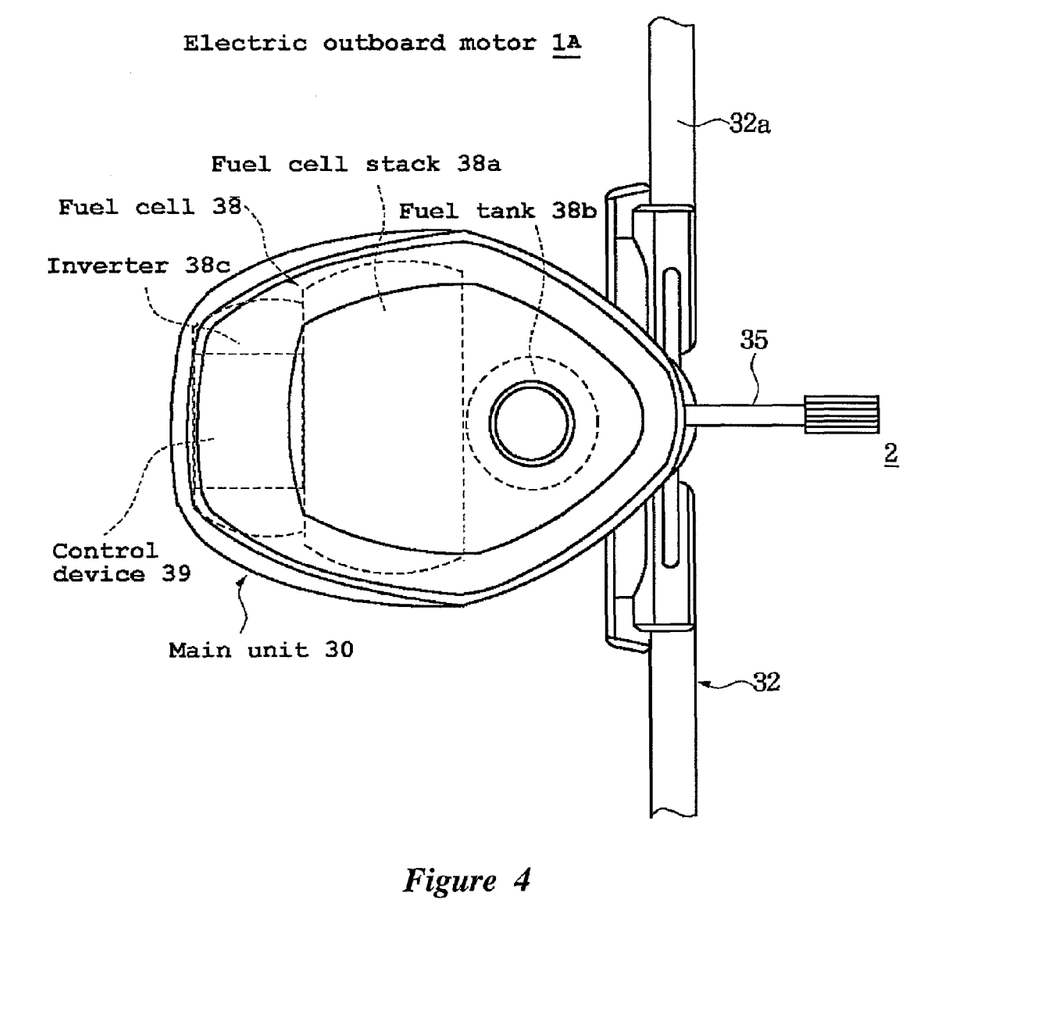
FIG. 4 is a top plan view of the outboard motor shown in FIG. 3.

FIGS. 3 and 4 show a modification of the outboard motor 1 illustrated in FIGS. 1 and 2. An electric outboard motor 1A of this embodiment can include a main unit 30 provided on a mounting bracket 31. The mounting bracket 31 can be fixed to a transom 32a of a hull 32 of an associated watercraft.

A lower case 34 can be provided at a lower side of the main unit 30, and an operating handle 35 can be provided at an upper side thereof. By manipulating the operating handle 35, the main unit 30 turns left and right around a steering shaft 90 for steering. The main unit 30 can be tilted up around a tilt shaft 33 by means of a tilt mechanism (not shown) so that the lower case 34 can be raised above the water surface while the boat is moored.

The lower case 34 can include a propeller 36 for producing thrust and a motor 37 for driving the propeller 36. A motor shaft 37a of the motor 37 and a propeller shaft 36a of the propeller 36 are arranged coaxially.

The main unit 30 can include a fuel cell 38 and a control device 39 for supplying electric power to drive the motor 37. The fuel cell 38 can include a fuel cell stack 38a for generating power, a fuel tank 38b for feeding fuel to the fuel cell stack 38a, and an inverter 38c for supplying power from the fuel cell stack 38a to the motor 37. The fuel cell 38 can be placed as an integrated unit in the main unit 30.

The fuel cell 38 can be arranged with the fuel tank 38b, the fuel cell stack 38a and the inverter 38c placed in this order from the hull 32 side, or the front side, and with the control device 39 placed under the inverter 38c.

The control device 39 can be configured to control the fuel cell 38 and the motor 37 according to an operation signal from a remote control device provided in a driver's area (not shown) of the boat 2. The control device 39 can also be configured to change the rotational direction of the motor 37 between forward and reverse, also according to an operation signal from the remote control device.

In this embodiment, as in the embodiment of FIGS. 1 and 2, power generated in the fuel cell 38 drives the motor 37 to produce thrust with the propeller 36. Since this embodiment does not use an internal combustion engine and instead uses the electric motor 37, no exhaust gas is emitted. This allows downsizing of the unit and improves the duration of cruise. With the motor 37, which generates heat, located underwater and hence cooled by the water, the motor 37 can operate at higher efficiencies.

In some embodiments, the fuel cell 38 is placed over the motor 37 and the propeller 36, and is integrated in the electric outboard motor 1A. This eliminates the need for connection with a battery located inside the boat 2 as in conventional approaches, which in turn allows easy mounting of the electric outboard motor 1A to the boat 2.

The fuel cell 38 can also be provided with the fuel tank 38b, the fuel cell stack 38a, and the inverter 38c arranged in this order from the front side, and an upper portion of the fuel tank 38b is placed higher than an upper portion of the transom 32a, and with the fuel cell stack 38a, the inverter 38c, and the control device 39 located lower than that. Thus, the distance between the motor 37 and the fuel cell 38 can be short, which contributes to downsizing of the unit, and the center of gravity can be lower relative to the hull 32.

With the fuel tank 38b placed in the electric outboard motor 1 being near to the rear of the boat 2, fuel can be supplied to the fuel tank 38b, or, where the fuel tank 38b is of a cartridge type, the cartridge can be replaced, easily from the boat 2 side.

Figure 5:
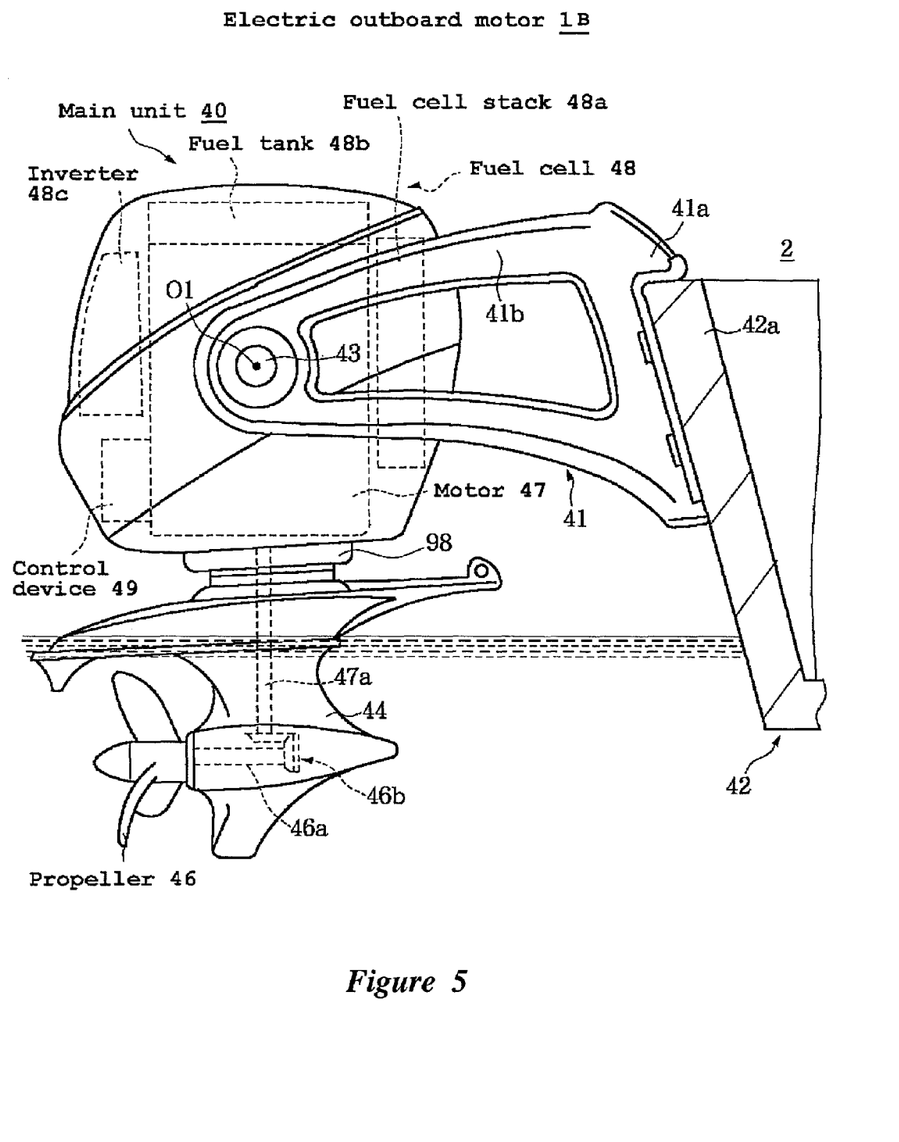
FIG. 5 is a side elevational view of another modification of the outboard motor of FIG. 1.
Figure 6:
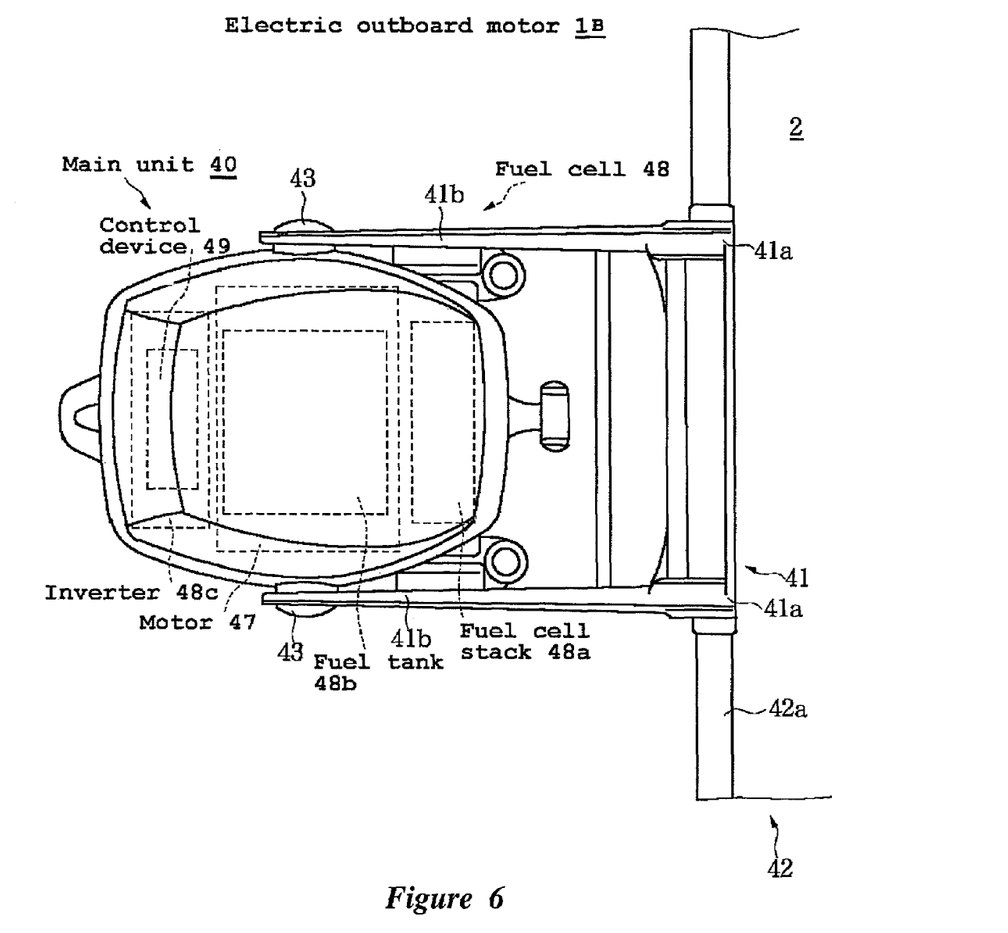
FIG. 6 is a top plan view of the outboard motor shown in FIG. 5.

FIGS. 5 and 6 show another modification of the outboard motor 1 of FIGS. 1 and 2. An electric outboard motor 1B of this embodiment has a main unit 40 provided on a tilt bracket 41. A mounting portion 41a of the tilt bracket 41 is fixed to a transom 42a of a hull 42.

A pair of left and right support portions 41b, 41b extend generally horizontally from the rear of the hull. The main unit 40 can be placed between the pair of left and right support portions 41b, 41b, supported at both its left and right sides by a tilt shaft 43 so as to be tilted up around it.

A lower case 44 can be provided under the main unit 40. A rotating mechanism 98 for rotating the lower case 44 can also be provided under the main unit 40.

The control device 49 can be configured to control the rotating mechanism 98 via, for example, remote control, to turn the lower case 44 left and right for steering. The lower case 44 can be provided with a propeller 46 for producing thrust and a power transmission device 46b for transmitting the rotation of a motor 47 to a propeller shaft 46a of the propeller 46.

In the main unit 40, the motor 47 can be placed so as to overlap a tilt axis O1, with a motor shaft 47a of the motor 47 extending downwardly. The rotation of the motor shaft 47a can be transmitted to the propeller shaft 46a via the power transmission device 46b.

The main unit 40 can also include a fuel cell 48 and a control device 49 for supplying electric power to drive the motor 47. The fuel cell 48 can include a fuel cell stack 48a for generating power, a fuel tank 48b for feeding hydrogen fuel to the fuel cell stack 48a, and an inverter 48c for supplying power from the fuel cell stack 48a to the motor 47.

The fuel cell 48 can be placed as a unit in the main unit 40. In this embodiment, the motor 47, and the fuel cell stack 48a and the inverter 48c as constituent members of the fuel cell 48 are arranged side by side as viewed from a lateral direction. Note, however, that the constituent members of the fuel cell 48 are not limited to this constitution.

The control device 49 can be configured to control the fuel cell 48 and the motor 47 according to an operation signal from a remote control device provided in a driver's area (not shown) of the boat 2. With control by the control device 49, the rotation of the motor 47 is transmitted from the motor shaft 47a to the propeller shaft 46a of the propeller 46 via the power transmission device 46b, so as to rotate the propeller 46 to run the boat. The control device 49 can also be configured to change the rotational direction of the motor 47 between forward and reverse.

This embodiment includes a propeller 46 for producing thrust, a motor 47 for driving the propeller 46, and a fuel cell 48 for supplying electric power to drive the motor 47. Power generated in the fuel cell 48 drives the motor 47 to produce thrust with the propeller 46.

The motor shaft 47a of the motor 47 and the propeller 46a of the propeller 46 are arranged crosswise via the power transmission device 46b, and the fuel cell 48 and the motor 47 are placed over the propeller 46. The fuel cell stack 48a is placed in front of the motor 47 with the inverter 48c and the control device 49 are placed in back thereof, and with the fuel tank 48b placed over the motor 47. The motor 47 and the fuel cell 48 are thus integrated, which allows downsizing of the unit by shortening the distance between the propeller 46, and the motor 47 and the fuel cell 48.

The electric outboard motor 1B is mounted to the boat 2 having a tilt bracket 41 extending generally horizontally from the rear of the hull, and the motor 47 of the electric outboard motor 1 is placed so as to overlap the tilt axis O1 of the tilt bracket 41. This can reduce power necessary for tilt operation, simplify a tilt drive device, and lower the center of gravity relative to the hull 42.

Figure 7:
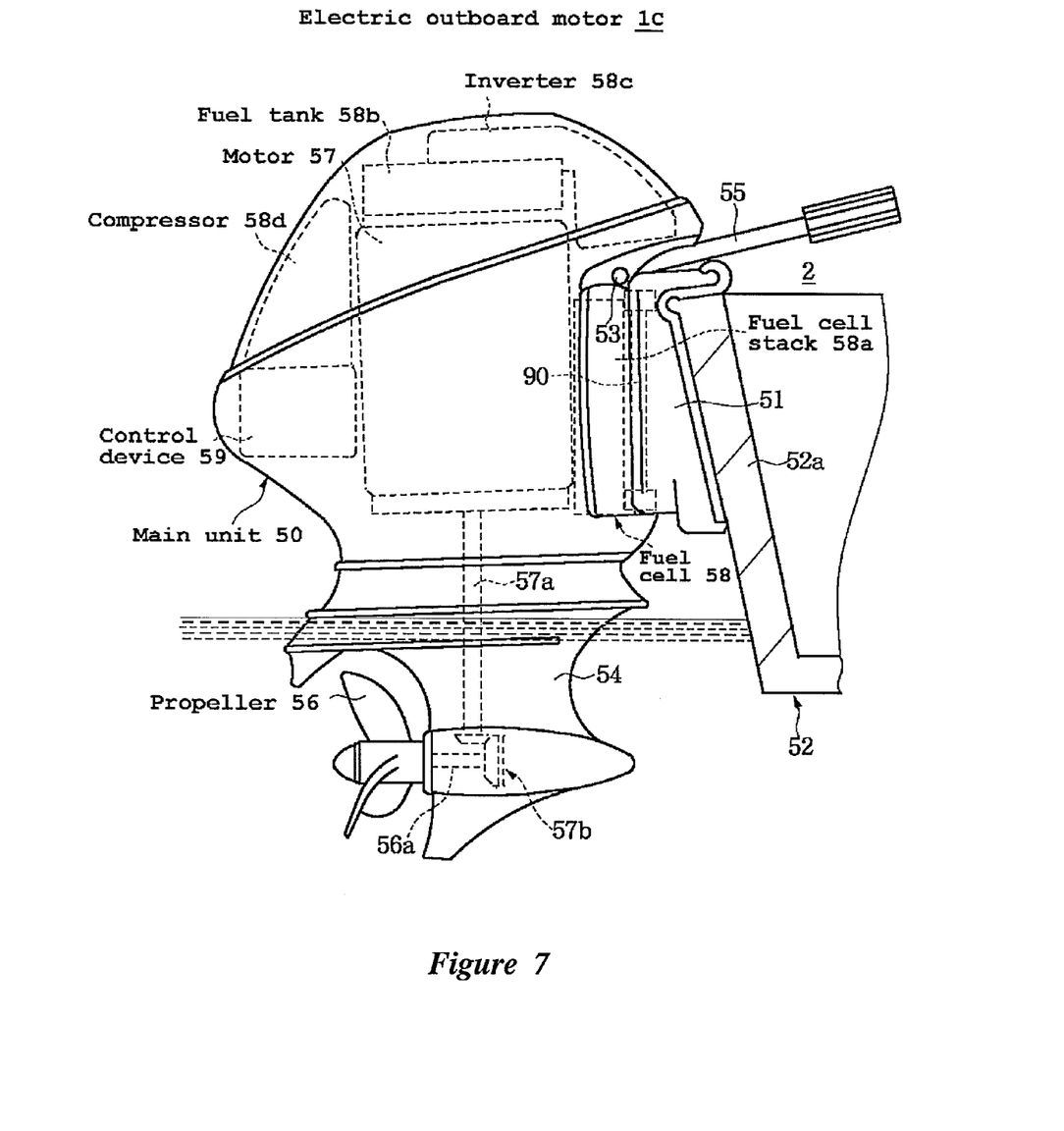
FIG. 7 is a side elevational view of yet another modification of the outboard motor of FIG. 1.
Figure 8:
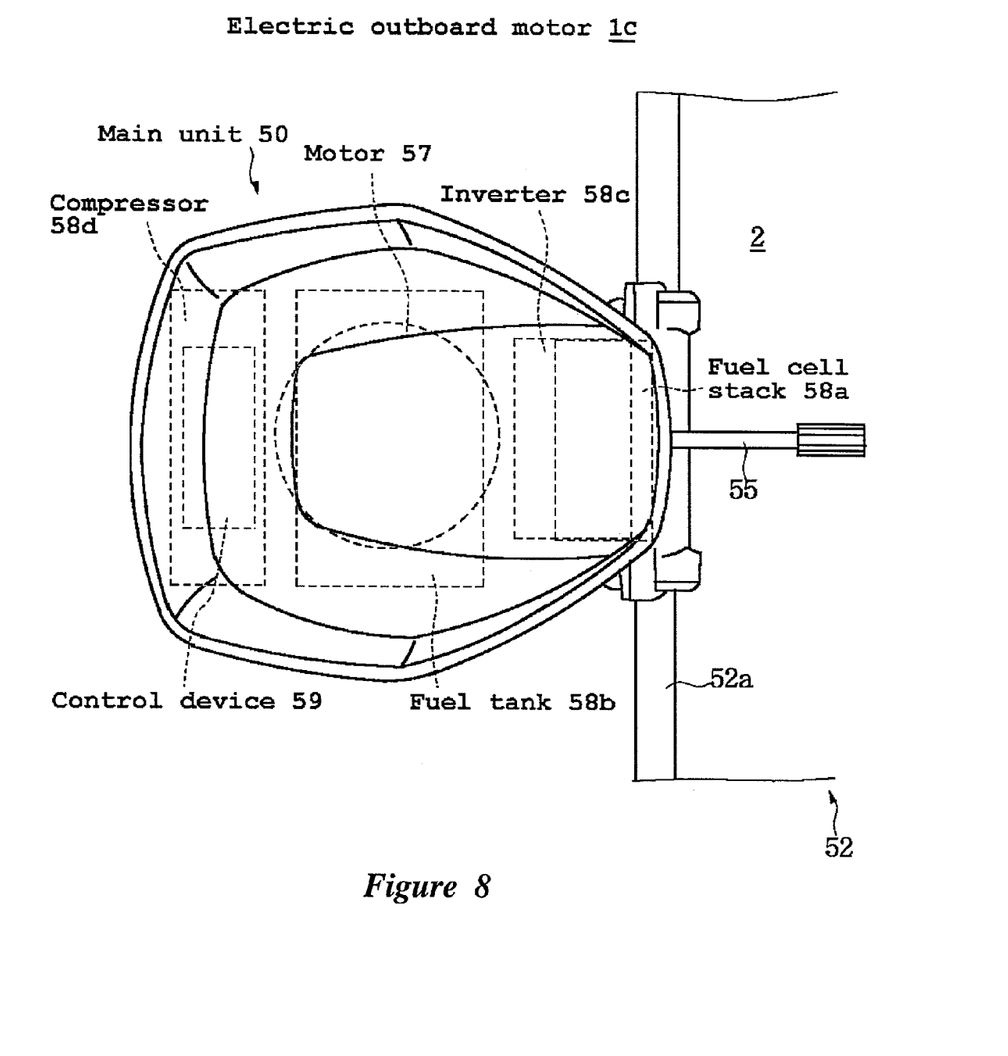
FIG. 8 is a top plan view of the outboard motor shown in FIG. 7.

FIGS. 7 and 8 show yet another modification of the outboard motor 1 of FIGS. 1 and 2. An electric outboard motor 1C of this embodiment has a main unit 50 provided on a mounting bracket 51. The mounting bracket 51 is fixed to a transom 52a of a hull 52. The main unit 50 can be supported by a tilt shaft 53 so as to be tilted up around it.

A lower case 54 can be provided at a lower side of the main unit 50, and an operating handle 55 can be provided at an upper side thereof. By manipulating the operating handle 55, the main unit 50 turns left and right around a steering shaft 90 for steering.

The lower case 54 can also be provided with a propeller 56 for producing thrust and a power transmission device 56b for transmitting the rotation of a motor 57 to a propeller shaft 56a of the propeller 56. The motor 57 can be placed in the main unit 50 with its motor shaft 57a extending downwardly. The rotation of the motor shaft 57a can be transmitted to the propeller shaft 56a via the power transmission device 56b.

The main unit 50 can include a fuel cell 58 and a control device 59 for supplying electric power to drive the motor 57. The fuel cell 58 can include a fuel cell stack 58a for generating power, a fuel tank 58b for feeding hydrogen fuel to the fuel cell stack 58a, an inverter 58c for supplying power from the fuel cell stack 58a to the motor 57, and a compressor 58d for accelerating the feed of the hydrogen fuel. The fuel cell 58 can be placed as a unit in the main unit 50.

In this embodiment, the motor 57, the fuel cell stack 58a, and the compressor 58d as constituent members of the fuel cell 58 are arranged side by side as viewed from a lateral direction. Note, however, that the constituent members of the fuel cell 58 may not be limited to this constitution.

The control device 59 can be configured to control the fuel cell 58 and the motor 57 according to an operation signal from a remote control device provided in a driver's area (not shown) of the boat 2. The control device 59 can also be configured to change the rotational direction of the motor 57 between forward and reverse, also according to an operation signal from the remote control device.

In this embodiment, the fuel cell stack 58a is placed in front of the motor 57 with the compressor 58d and the control device 59 placed in back thereof and with the fuel tank 58b and the inverter 58c placed over the motor 57. The motor 57 and the fuel cell 58 are thus integrated, which allows downsizing of the unit by shortening the distance between the propeller 56, and the motor 57 and the fuel cell 58, and lowering the center of gravity relative to the hull 52.

With the fuel tank 58b placed in the electric outboard motor 1 being placed over the motor 57, fuel can be supplied to the fuel tank 58b, or, where the fuel tank 58b is of a cartridge type, the cartridge can be replaced, easily from the boat 2 side. Since the motor 57 which generates heat is located underwater and hence cooled by the water, the motor 57 can operate at higher efficiencies.

Figure 9:
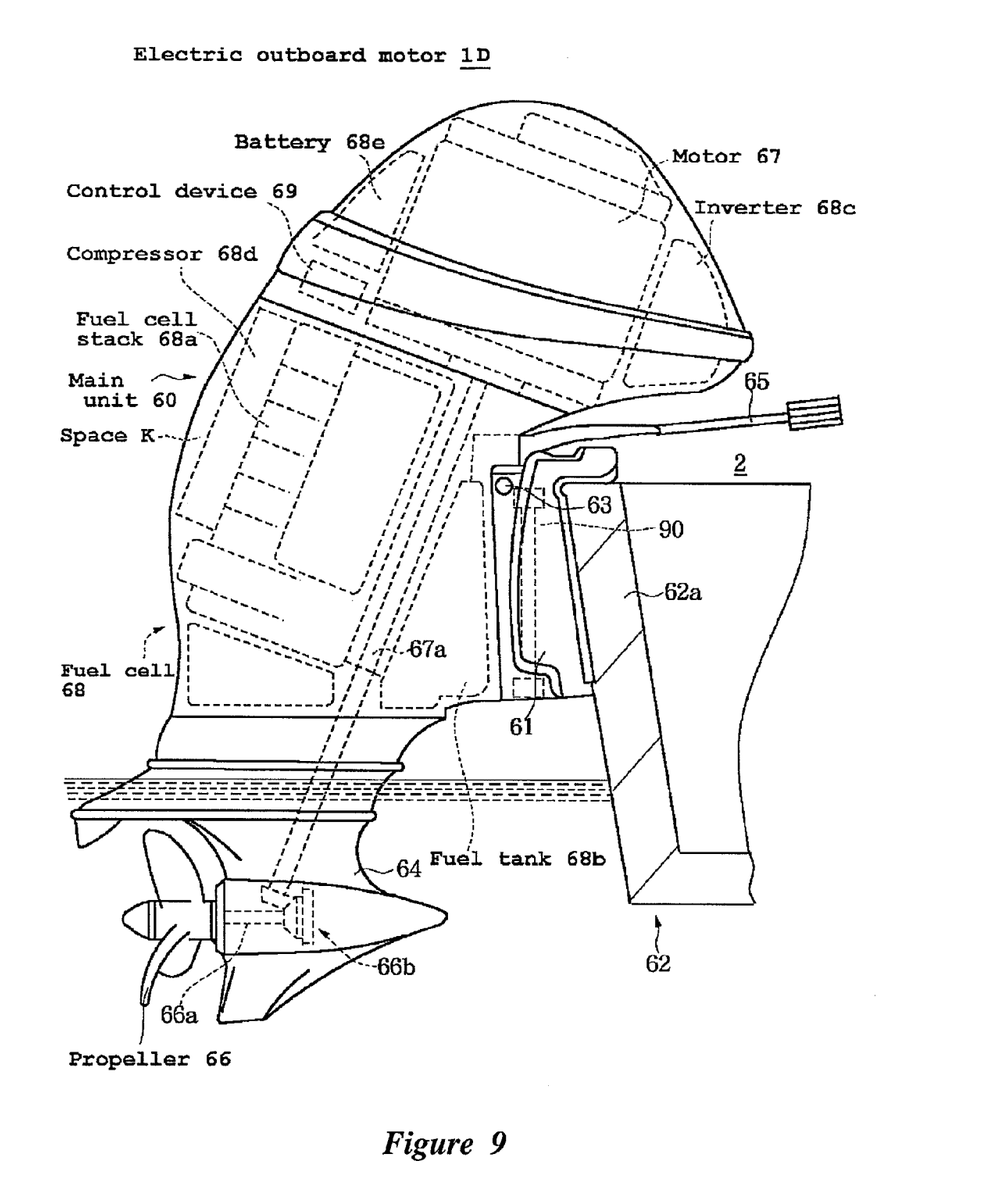
FIG. 9 is a side elevational view of a further modification of the outboard motor of FIG. 1.
Figure 10:
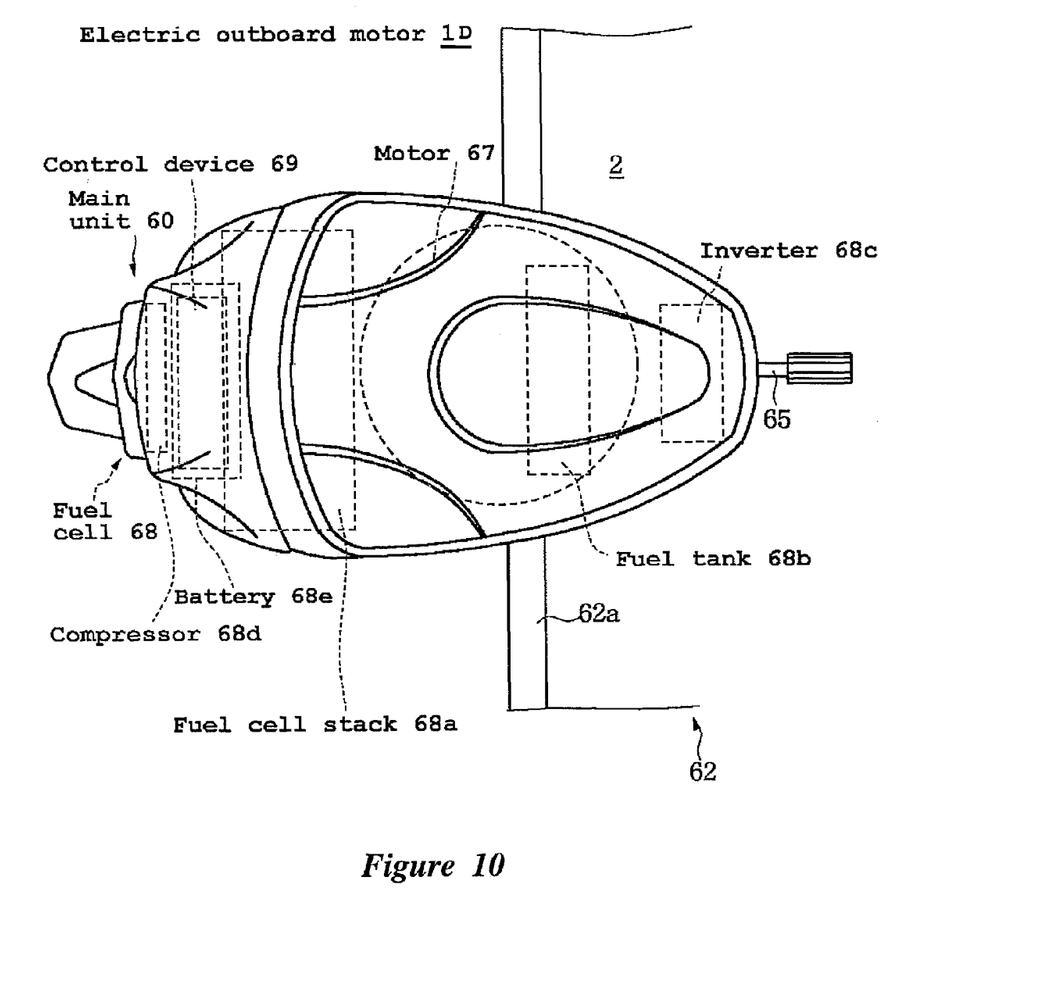
FIG. 10 is a top plan view of the outboard motor shown in FIG. 9.

FIGS. 9 and 10 show an additional modification of the outboard motor 1 of FIGS. 1 and 2. An electric outboard motor 1D of this embodiment can have a main unit 60 provided on a tilt bracket 61. The tilt bracket 61 can be fixed to a transom 62a of a hull 62. The main unit 60 can be supported by a tilt shaft 63 so as to be tilted up around it.

A lower case 64 can be provided at a lower side of the main unit 60, and an operating handle 65 can be provided at an upper side thereof. By manipulating the operating handle 65, the main unit 60 turns left and right around a steering shaft 90 for steering. The lower case 64 can include a propeller 66 for producing thrust and a power transmission device 66b.

A motor 67 can be placed in the main unit 60, with its motor shaft 67a tilted obliquely forwardly. The rotation of the motor shaft 67a can be transmitted to a propeller shaft 66a via the power transmission device 66b. When the motor shaft is tilted forwardly, the propeller 66 can be placed away from a rear bottom of the boat, and thus, in such embodiments, the effects of a rear water flow are reduced thereby improving the propulsion efficiency.

The main unit 60 can include a fuel cell 68 and a control device 69 configured to supply electric power to drive the motor 67. The fuel cell 68 can includes a fuel cell stack 68a for generating power, a fuel tank 68b for feeding hydrogen fuel to the fuel cell stack 68a, an inverter 68c for supplying power from the fuel cell stack 68a to the motor 67, a compressor 68d for accelerating the feed of the hydrogen fuel, and a battery 68e for storing power.

The inverter 68c can be placed in front of the motor 67, and the battery 68e and the control device 69 can be placed in back thereof. In this embodiment, the motor 67 and the inverter 68c, as a constituent member of the fuel cell 68, are arranged side by side as viewed from a lateral direction. Note, however, that the constituent members of the fuel cell 68 may not be limited to this constitution.

The control device 69 can be configured to control the fuel cell 68 and the motor 67 according to an operation signal from a remote control device provided in a driver's area (not shown) of the boat 2. The control device 69 can also be configured to change the rotational direction of the motor 67 between forward and reverse, also according to an operation signal from the remote control device.

In this embodiment, power generated in the fuel cell 68 drives the motor 67 to produce thrust with the propeller 66 so as to propel the boat. Since this embodiment does not use an internal combustion engine, but instead uses the electric motor 67, no exhaust gas is emitted. This allows downsizing of the unit and can improve the range of the boat.

The fuel cell stack 68a, the fuel tank 68b, and the compressor 68d of the fuel cell 68 can be placed in a space K between the motor 67 and the propeller 66. By utilizing the space K, an upper portion of the electric outboard motor 1D can be placed lower, which in turn lowers the center of gravity relative to the hull 62. In addition, placing the fuel cell 68 away from the lateral sides of the motor 67 and instead in an area such as between the motor 67 and the propeller 66, allows use of a motor 67 with a larger diameter and hence with higher output.

In this embodiment, the fuel cell stack 68a, the fuel tank 68b, and the compressor 68d, as part of constituent members of the fuel cell 68, can be placed in the space K between the motor 67 and the propeller 66. Note, however, that the present embodiment is not limited to this constitution.

Figure 11:
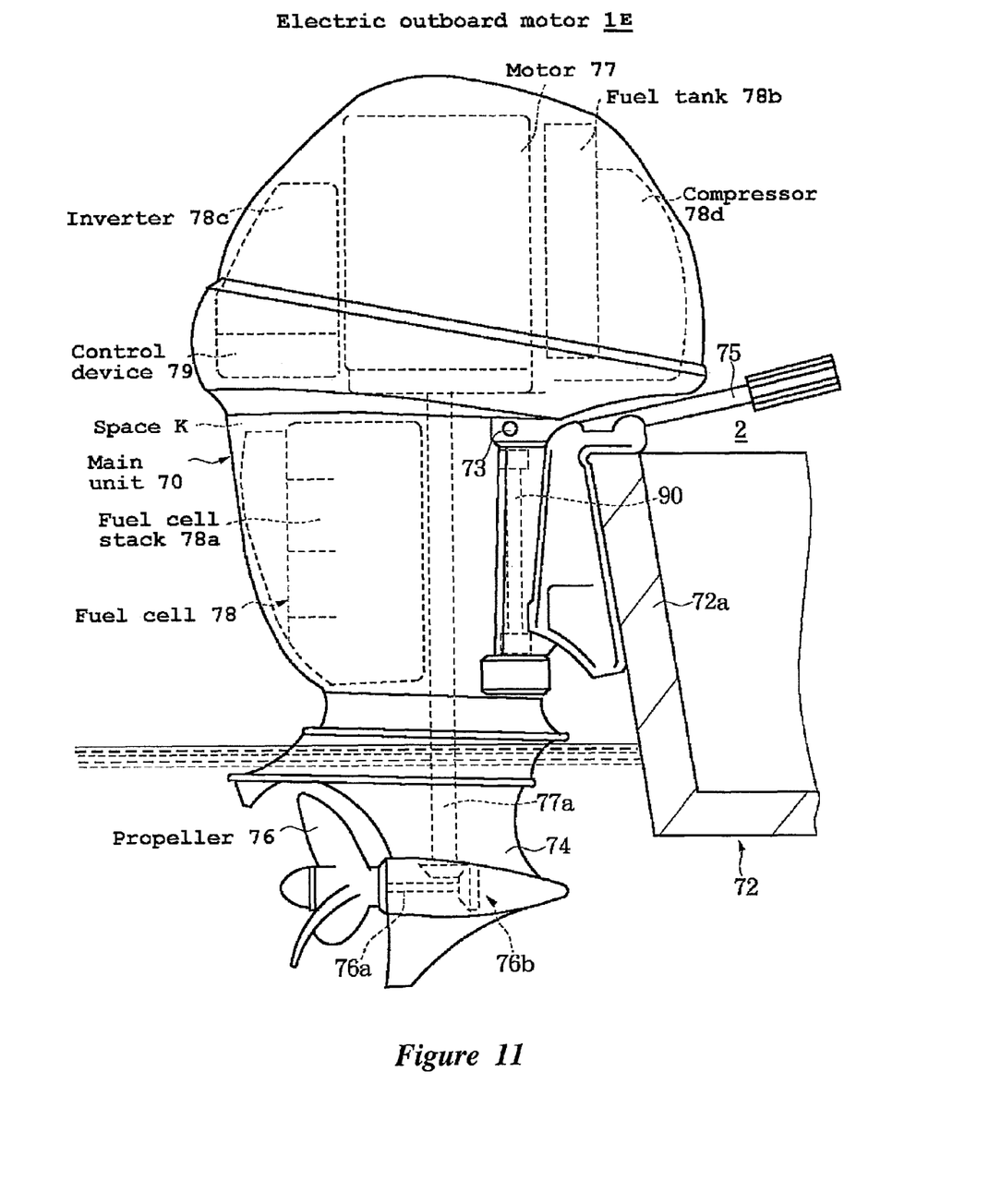
FIG. 11 is a side elevational view of an additional modification of the outboard motor of FIG. 1.
Figure 12:
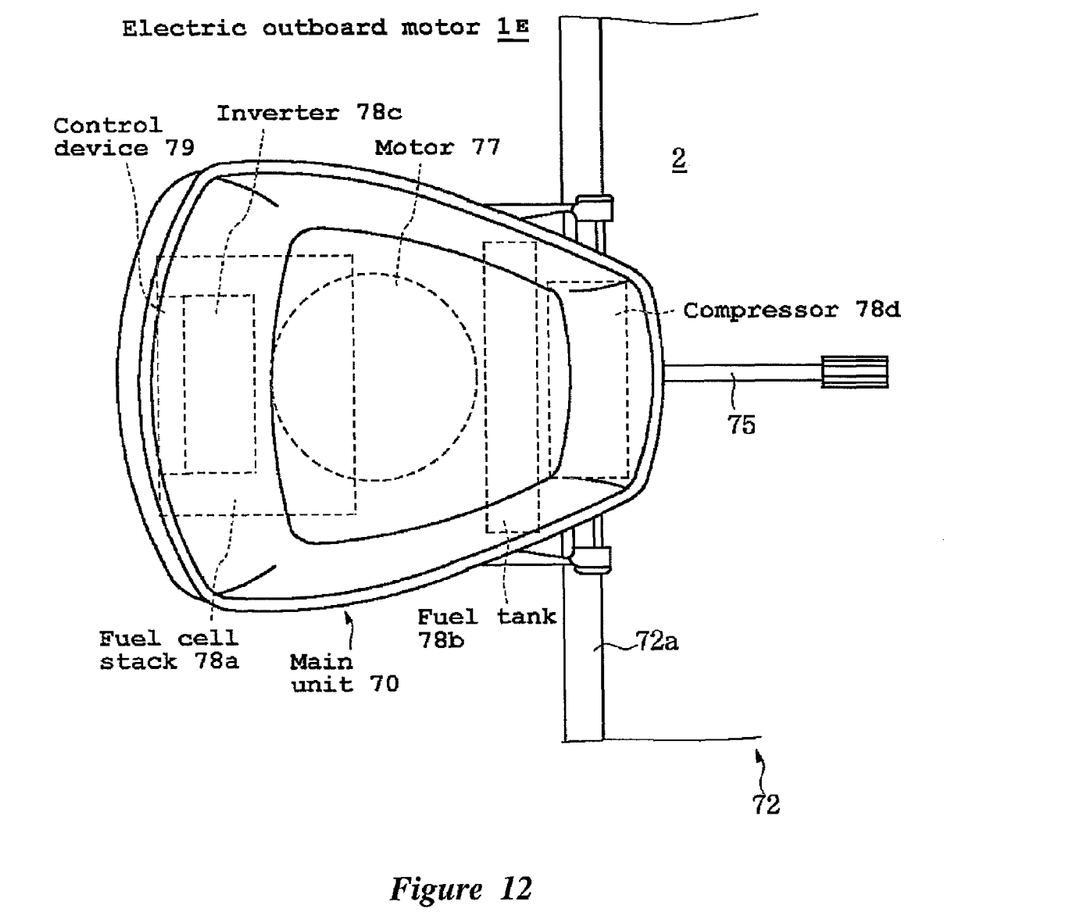
FIG. 12 is a top plan view of the outboard motor shown in FIG. 11.

FIGS. 11 and 12 show another modification of the outboard motor 1 of FIGS. 1 and 2. As in the embodiment of FIGS. 9 and 10, an electric outboard motor 1E of this embodiment has a main unit 70 provided on a mounting bracket 71. The mounting bracket 71 can be fixed to a transom 72a of a hull 72. The main unit 70 can also be supported by a tilt shaft 73 so as to be tilted up around it.

A lower case 74 can be provided at a lower side of the main unit 70, and an operating handle 75 can be provided at an upper side thereof. The lower case 74 can include a propeller 76 for producing thrust and a power transmission device 76b. A motor 77 can be placed in the main unit 70, with its motor shaft 77a extending downwardly. The rotation of the motor shaft 77a can be transmitted to a propeller shaft 76a via the power transmission device 76b.

The main unit 70 can also include a fuel cell 78 and a control device 79 configured to supply electric power to drive the motor 77. The fuel cell 78 can also include a fuel cell stack 78a for generating power, a fuel tank 78b for feeding hydrogen fuel to the fuel cell stack 78a, an inverter 78c for supplying power from the fuel cell stack 78a to the motor 77, and a compressor 78d for accelerating the feed of the hydrogen fuel.

The fuel tank 78b and the compressor 78d can be placed in front of the motor 77, and the inverter 78c and the control device 79 can be placed in back thereof. In this embodiment, the motor 77, and the fuel tank 78b, the compressor 78d, and the inverter 78c, as constituent members of the fuel cell 78, are arranged side by side as viewed from a lateral direction.

Note, however, that the constituent members of the fuel cell 78 may not be limited to this constitution.

In this embodiment, power generated in the fuel cell 78 drives the motor 77 to produce thrust with the propeller 76 so as to propel the boat. The rotational direction of the motor 77 can also be changed to switch between forward and reverse. A space K between the motor 77 and the control device 79, and the propeller 76 can be utilized for the fuel cell stack 78a of the fuel cell 78.

By utilizing the space K between the motor 77 and the propeller 76, the fuel cell stack 78a can be placed under the motor 77, lowering the center of gravity relative to the hull 72. In addition, placing the fuel cell 78 in an area other than adjacent to the lateral sides of the motor 77, such as in an area between the motor 77 and the propeller 76, allows use of a motor 77 with a larger diameter and hence with higher output.

In this embodiment, the fuel cell stack 78a as part of constituent members of the fuel cell 78 can be placed in the space K between the motor 77 and the propeller 76. However, the present inventions are not limited to this constitution. In the embodiments shown in FIGS. 5 through 12, the motor shaft of the motor is extended to transmit the rotation thereof to the propeller shaft via a power transmission device. Alternatively, the motor shaft may not be extended but be coupled to a drive shaft, through which the rotation of the motor is transmitted to the propeller shaft via a power transmission mechanism.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An electric propulsion unit comprising a propeller configured to produce thrust for a watercraft, a motor configured to drive the propeller, and a fuel cell configured to supply electric power to drive the motor, wherein the electric propulsion unit is configured to be mounted on a boat having a tilt bracket extending generally horizontally from a rear of its hull, and wherein the motor is arranged so as to overlap a tilt axis of the tilt bracket.

2. The electric propulsion unit of claim 1, wherein the fuel cell includes a fuel cell stack configured to generate electric power and a fuel tank configured to supply fuel to the fuel cell stack.

3. The electric propulsion unit of claim 1, wherein a motor shaft of the motor and a propeller shaft of the propeller are arranged coaxially, and wherein the fuel cell is placed over the motor and the propeller.

4. The electric propulsion unit of claim 2, wherein a motor shaft of the motor and a propeller shaft of the propeller are arranged coaxially, and wherein the fuel cell is placed over the motor and the propeller.

5. The electric propulsion unit of claim 1, wherein a motor shaft of the motor and a propeller shaft of the propeller are arranged transversely to each other, and wherein the fuel cell and the motor are disposed over the propeller.

6. The electric propulsion unit of claim 2, wherein a motor shaft of the motor and a propeller shaft of the propeller are arranged transversely to each other, and wherein the fuel cell and the motor are disposed over the propeller.

7. The electric propulsion unit of claim 1, wherein the motor and at least one constituent component of the fuel cell are arranged side by side as viewed from a lateral direction.

8. The electric propulsion unit of claim 2, wherein the motor and at least one constituent component of the fuel cell are arranged side by side as viewed from a lateral direction.

9. The electric propulsion unit of claim 3, wherein the motor and at least one constituent component of the fuel cell are arranged side by side as viewed from a lateral direction.

10. An electric propulsion unit comprising a propeller configured to produce thrust for a watercraft, a motor configured to drive the propeller, and a fuel cell configured to supply electric power to drive the motor, wherein the motor is placed over the propeller, and at least one constituent component of the fuel cell is disposed in a space between the motor and the propeller.

11. An electric propulsion unit comprising a propeller configured to produce thrust for a watercraft, a motor configured to drive the propeller, and a fuel cell configured to supply electric power to drive the motor, wherein the fuel cell includes a fuel cell stack configured to generate electric power and a fuel tank configured to supply fuel to the fuel cell stack, and wherein the motor is placed over the propeller, and at least one constituent component of the fuel cell is disposed in a space between the motor and the propeller.

12. An electric propulsion unit comprising a propeller configured to produce thrust for a watercraft, a motor configured to drive the propeller, and a fuel cell configured to supply electric power to drive the motor, wherein a motor shaft of the motor and a propeller shaft of the propeller are arranged coaxially, and wherein the fuel cell is placed over the motor and the propeller, and wherein the motor is placed over the propeller, and at least one constituent component of the fuel cell is disposed in a space between the motor and the propeller.

13. An outboard motor comprising a fuel cell stack configured to generate electric power, a fuel tank configured to contain fuel for the fuel cell stack, an electric motor, an inverter configured to supply electric power from the fuel cell stack to the electric motor, and a propeller driven by the electric motor, wherein the electric motor and at least one constituent component of the fuel cell are arranged side by side as viewed from a lateral direction.

14. The outboard motor according to claim 13 additionally comprising an outer housing extending over all of the fuel cell stack, the fuel tank, the electric motor, and the inverter.

15. The outboard motor according to claim 14, wherein the fuel tank in configured to contain hydrogen fuel for the fuel cell stack.

16. An outboard motor comprising an upper cowling, a lower drive unit configured to operate below water, a fuel cell stack configured to generate electric power, an electric motor disposed in the upper cowling, an inverter configured to supply electric power from the fuel cell stack to the electric motor, a propeller disposed in the lower drive unit driven by the electric motor, and a fuel tank configured for storing hydrogen fuel for the fuel cell stack within the outboard motor.

17. The electric propulsion unit of claim 1, wherein the tilt axis extends through the motor.

* * * * *